United States Patent
McGee et al.

(10) Patent No.: US 7,085,631 B2
(45) Date of Patent: Aug. 1, 2006

(54) VEHICLE AND METHOD FOR OPERATING AN ENGINE IN A VEHICLE

(75) Inventors: Ryan McGee, Ann Arbor, MI (US); Chris Kapolnek, Dearborn, MI (US); Paul Gartner, Dearborn, MI (US); Carol Okubo, Belleville, MI (US); Paul Niessen, Plymouth, MI (US); Waheed Alashe, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 10/710,715

(22) Filed: Jul. 29, 2004

(65) Prior Publication Data

US 2006/0025904 A1    Feb. 2, 2006

(51) Int. Cl.
*B60L 9/00*    (2006.01)

(52) U.S. Cl. ............... 701/22; 180/65.4; 180/65.8; 477/2

(58) Field of Classification Search ........... 701/22, 701/36, 99, 101, 113; 180/65.1–65.8; 477/2, 477/3
See application file for complete search history.

(56) References Cited

U.S. PATENT DOCUMENTS

| | | |
|---|---|---|
| 4,539,956 A | 9/1985 | Hengel et al. |
| 5,109,695 A | 5/1992 | James et al. |
| 5,935,042 A | 8/1999 | Thomas et al. |
| 6,254,512 B1 * | 7/2001 | Minowa et al. ............. 477/156 |
| 6,314,802 B1 | 11/2001 | Wu et al. |
| 6,364,807 B1 * | 4/2002 | Koneda et al. ................ 477/5 |
| 6,415,764 B1 * | 7/2002 | Manchester ................. 123/329 |
| 6,553,958 B1 | 4/2003 | Kolmanovsky |
| 6,691,807 B1 | 2/2004 | Bhavsar et al. |
| 6,886,524 B1 * | 5/2005 | Hanada et al. ........... 123/198 F |
| 7,003,394 B1 * | 2/2006 | Takahashi et al. .......... 701/104 |
| 2003/0173123 A1 | 9/2003 | Nakanowatari |

* cited by examiner

*Primary Examiner*—Richard M. Camby
(74) *Attorney, Agent, or Firm*—David B. Kelley; Brooks & Kushman

(57) ABSTRACT

A vehicle and method are provided that determine a misfire torque limit for an engine in the vehicle. The vehicle includes an electric machine operable to provide torque to the engine. The method includes commanding the engine to operate at a predetermined torque and a predetermined speed, thereby putting the engine in an idle state. An output torque of the engine is then determined while the engine is in the idle state. A torque offset, defined as the difference between the torque command and the determined engine output torque, is also determined. The misfire torque limit for the engine is then determined based at least in part on the torque offset.

23 Claims, 4 Drawing Sheets

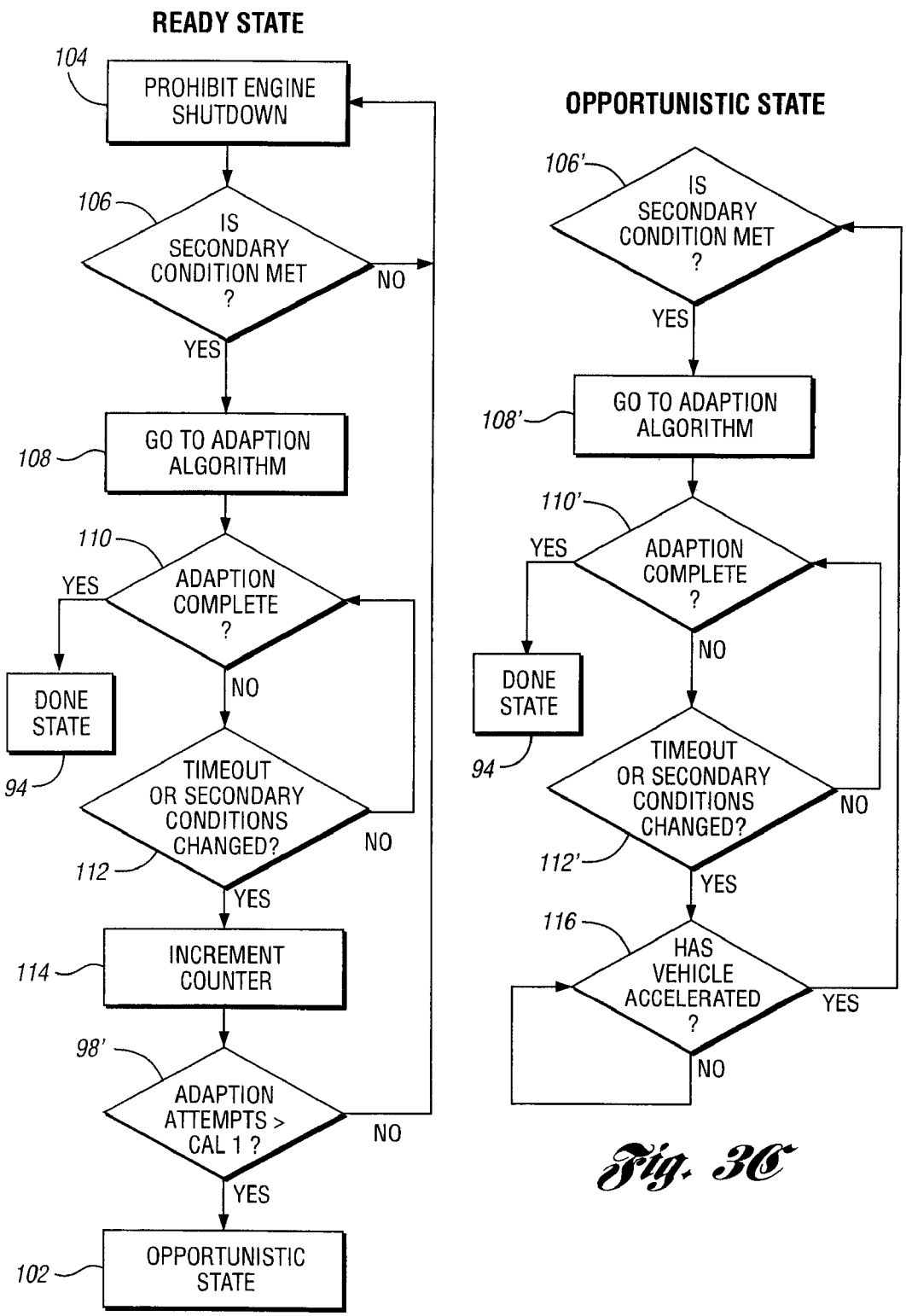

VEHICLE AND METHOD FOR OPERATING AN ENGINE IN A VEHICLE

BACKGROUND OF INVENTION

1. Field of the Invention

The present invention relates to a vehicle and a method for operating an engine in a vehicle.

2. Background Art

An engine in a vehicle can be operated in various ways to help minimize emissions. For example, operating the engine such that combustion is stable will help reduce emissions. To maintain stable combustion, a minimum amount of air flow into the engine must be maintained. This engine operating point may be referred to as a "combustion stability limit." The combustion stability limit may be defined in terms of air flow, or the air flow can be translated into an engine brake torque value. Thus, a minimum engine torque may be set to ensure stable combustion. This torque value, called the "misfire torque limit," is the lower bound of the engine torque production. In many vehicles, a buffer is provided such that the misfire torque limit is set above the true combustion stability limit. This buffer helps to ensure that the vehicle will not operate in the unstable combustion region, despite age and wear on the engine components.

In a vehicle such as a hybrid electric vehicle (HEV), very low engine torque outputs may be required under certain conditions. In an HEV, excess torque produced by the engine may translate into a charging current into the battery. If the battery charging is unchecked, the battery may overcharge, leading to reduced battery performance and battery life. Because of these battery constraints, it is desirable to set the misfire torque limit as low as possible—i.e., the buffer between the misfire torque limit and the true combustion stability limit should be reduced or eliminated. Because the misfire torque limit may increase as the engine ages, a method for adjusting the misfire torque limit is needed to satisfy the dual goals of keeping the misfire torque limit low, while not allowing the engine to operate below the true combustion stability limit.

One system that can be used to deal with engine misfires is discussed in U.S. Patent Application Publication No. 2003/0173123, filed by Nakanowatari and published on Sep. 18, 2003. The system described in Nakanowatari includes an engine misfire determination section that determines whether an engine misfire has occurred. The control system also includes a control section that permits operation of only the motor to propel the vehicle, while inhibiting operation of the engine, when it is determined that a misfire has occurred. If it is determined that the battery is in need of charging, the engine may be allowed to operate in order to charge the battery before the motor takes over. One limitation of the system described in the Nakanowatari is that it does not provide a means to help ensure that the engine is operated only in those states where misfires are unlikely to occur.

SUMMARY OF INVENTION

Accordingly, one advantage of the present invention is that it provides a vehicle and method for satisfying the dual goals of keeping the misfire torque limit low, while simultaneously operating the engine above the true combustion stability limit.

The invention also provides a method for determining an idle torque for an engine in a vehicle. The idle torque for the engine is at least partly based on an engine torque level below which engine misfires will occur. The vehicle includes an electric machine operable to provide torque to the engine. The method includes commanding the engine to operate in an idle state, including providing a torque command to the engine. An output torque of the engine is determined while the engine is in the idle state. A torque offset, defined as a difference between the torque command and the determined engine output torque, is also determined. The idle torque for the engine is determined based at least in part on the torque offset.

The invention further provides a method for determining an idle torque for an engine in a vehicle. The vehicle includes an electric machine operable to provide torque to the engine, and an energy storage device capable of providing energy to operate the electric machine. The method includes determining whether at least one initial condition is met, and initiating an idle torque adaption algorithm when the at least one initial condition is met. The idle torque adaption algorithm includes commanding the engine to operate in an idle state, including providing a torque command to the engine. An output torque of the engine is determined while the engine is in the idle state. A torque offset, defined as a difference between the torque command and the determined engine output torque, is also determined. It is determined whether at least one secondary condition is met. The idle torque for the engine is determined based at least in part on the torque offset when the at least one secondary condition is met, and the idle torque adaption algorithm is restarted when the at least one secondary condition is not met.

The invention also provides a vehicle, including an engine and an electric machine operable to provide a torque to the engine. The vehicle also includes at least one controller configured to command the engine to operate in an idle state by at least providing a torque command to the engine. The at least one controller is further configured to determine an output torque of the engine while the engine is in the idle state. A torque offset is also determined. The torque offset is defined as a difference between the torque command and the determined engine output torque. The idle torque for the engine is determined based at least in part on the torque offset.

BRIEF DESCRIPTION OF DRAWINGS

FIGS. 3A–3C illustrate a method of the present invention which incorporates the adaption algorithm shown in FIGS. 2A and 2B.

DETAILED DESCRIPTION

Figure 1:
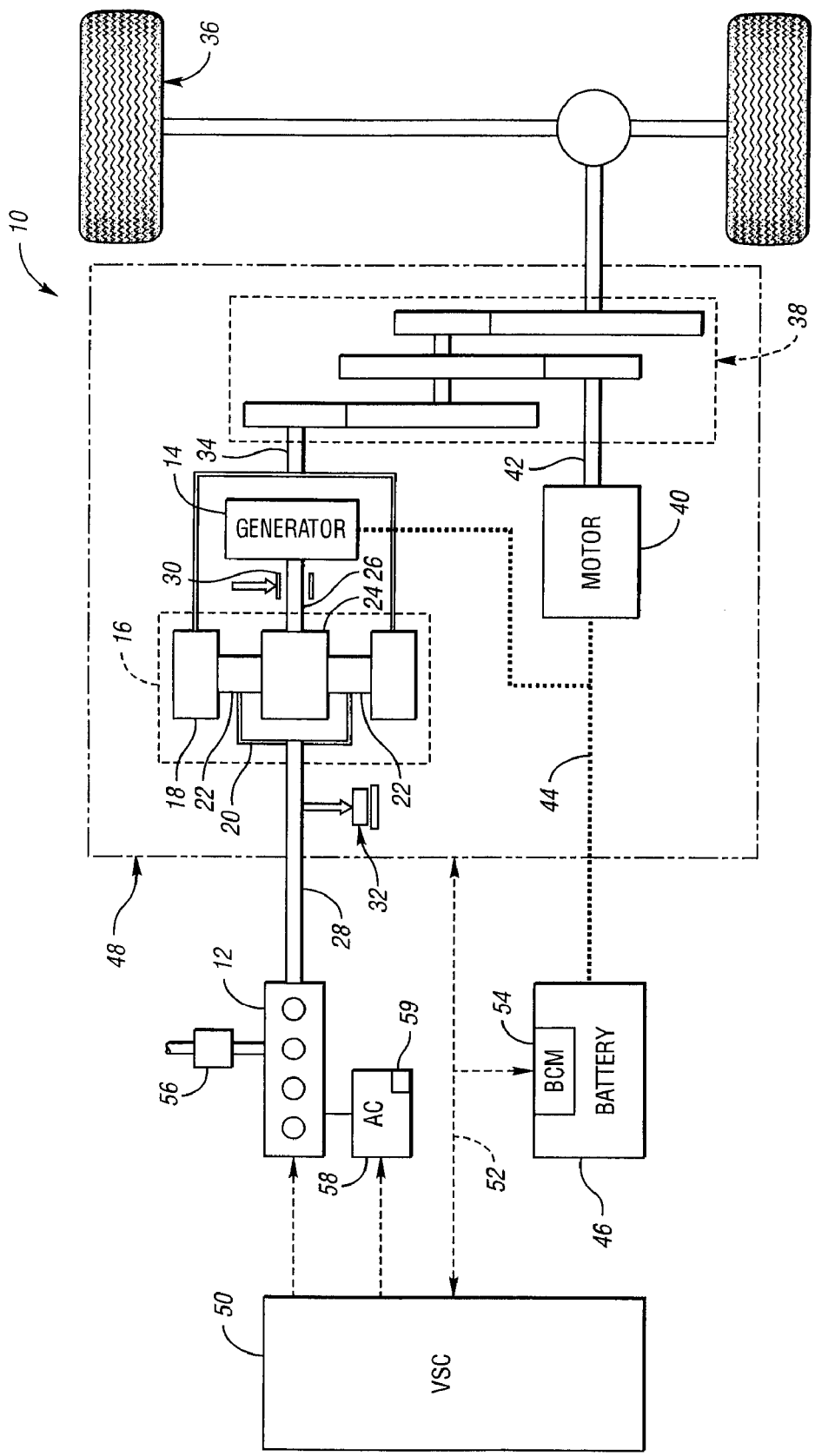
FIG. 1 is a schematic representation of a portion of a vehicle in accordance with the present invention.

FIG. 1 shows a schematic representation of a vehicle 10 in accordance with the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transaxle 48. To control the engine 12 and the components of the transaxle 48—i.e., the generator 14 and motor 40—a controller 50 is provided. As shown in FIG. 1, the controller 50 is a vehicle system controller (VSC), and although it is shown as a single controller, it may include multiple controllers. For example, the VSC 50 may include a separate powertrain control module (PCM), which could be software embedded within the VSC 50, or it could be a separate hardware device.

A controller area network (CAN) 52 allows the VSC 50 to communicate with the transaxle 48 and a battery control mode (BCM) 54. Just as the battery 46 has the BCM 54, other devices controlled by the VSC 50 may have their own controllers. For example, an engine control unit (ECU) may communicate with the VSC 50 to perform control functions on the engine 12. In addition, the transaxle 48 may include one or more controllers, such as a transaxle control module (TCM), configured to control specific components within the transaxle 48, such as the generator 14 and/or the motor 40.

The BCM 54 communicates with the VSC 50 via the CAN 52. The BCM 54 provides information to the VSC 50, such as the temperature, the SOC, and/or other operating conditions of the battery 46. The BCM 54 also communicates to the VSC 50 information such as a discharge power limit for the battery 46. The discharge power limit depends, in part, on the particular battery being used, and also depends on the operating conditions of the battery. A battery manufacturer may provide battery data, including discharge power limits for various operating conditions. Typically, the discharge power limit is a power level, beyond which operation of the battery, for some length of time, may damage the battery. Thus, it is generally desirable to keep the output power of a battery, such as the battery 46, at or below the discharge power limit.

The vehicle 10 also includes a portion of an emissions system, in particular, a carbon canister 56. The carbon canister 56 is configured to collect fuel vapors to reduce vehicle emissions. From time to time, the canister 56 may be purged, such that collected vapors are taken into the engine air intake system and combusted. In addition to the emissions system, the vehicle 10 also includes an air conditioning system 58, that includes a compressor 59.

Figure 2A:
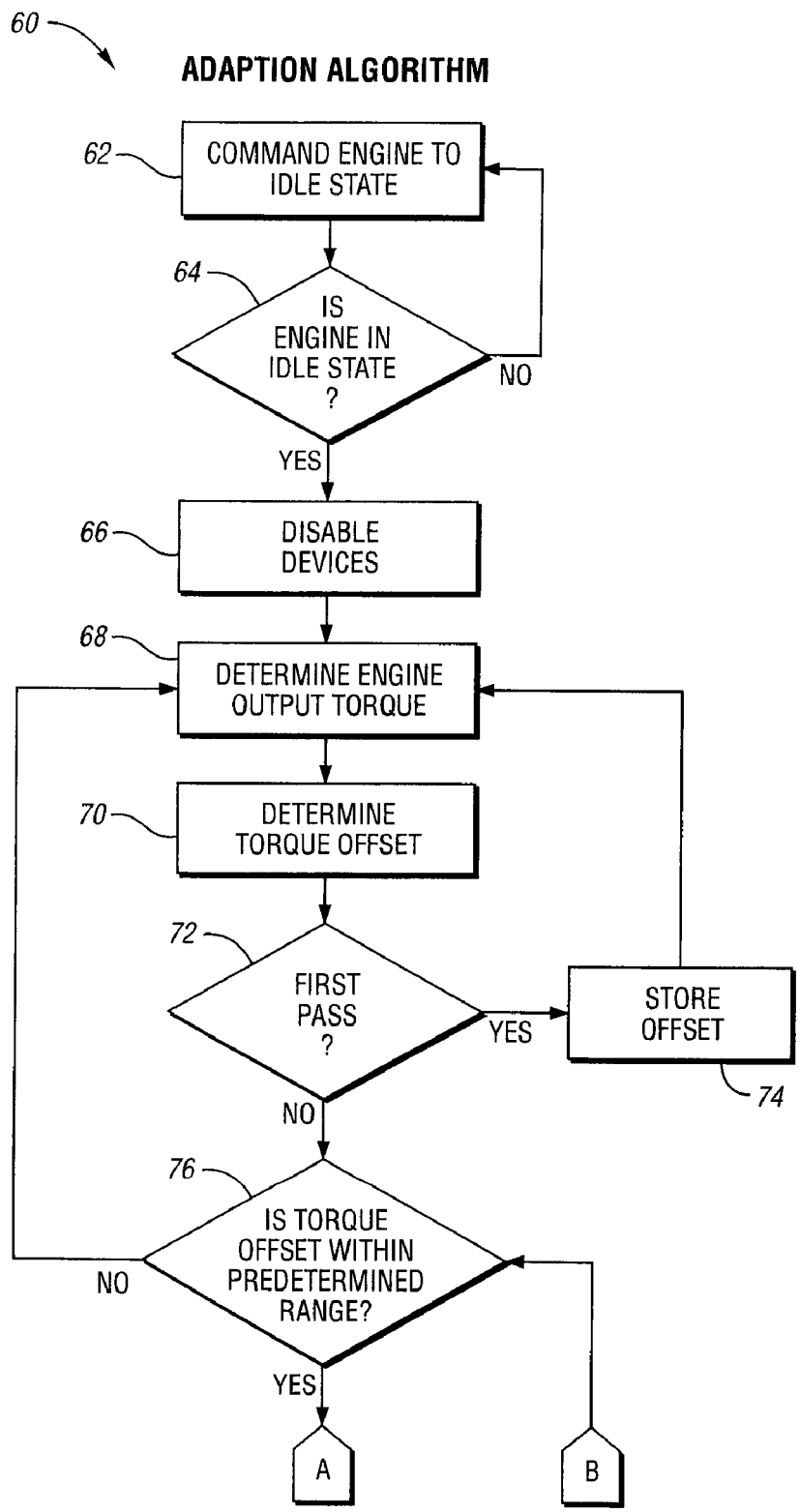
FIGS. 2A and 2B illustrate an adaption algorithm in accordance with the present invention.
Figure 2B:
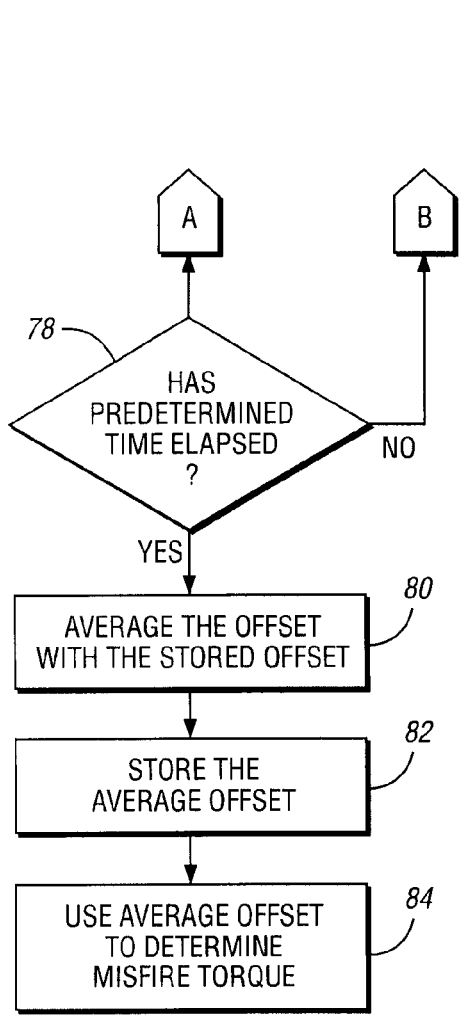

FIGS. 2A and 2B show a flowchart 60 illustrating a method of the present invention, and in particular, a method for determining an idle torque, or torque misfire limit, for an engine. As discussed above, there are dual goals for operating an engine in a vehicle, such as the engine 12 in the vehicle 10: set the misfire torque limit high enough to ensure stable combustion, while at the same time keeping it low enough so that the battery is not overcharged. The adaption algorithm shown in FIGS. 2A and 2B illustrates a method to meet both of these goals. The adaption algorithm, which may be programmed into the VSC 50, another of the vehicle controllers, or a combination of controllers, begins at step 62 where the engine 12 is commanded into an idle state. The command can be carried out, for example, by providing a torque command, and/or speed command to the engine 12. At decision block 64, checks are performed to determine whether the engine 12 is in the idle state—i.e., the engine speed and torque are examined to determine if they are close to the commanded values. If they are not, the method loops back to step 62.

If, at decision block 64, it is determined that the engine is in the idle state, one or more devices of the vehicle 10 are disabled—see step 66. The reason that it may be desirable to disable some of the devices of the vehicle 10, is because step 68 requires a determination of the engine output torque. As shown in FIG. 1, the air conditioning system 58 is connected to the engine 12, which provides torque to operate the compressor 59. Thus, operation of the compressor 59 can affect the engine output torque. In addition, purging the carbon canister 56 of vapors can also affect the engine output torque. Therefore, when devices such as the compressor 59 are in operation, or the carbon canister 56 is being purged, not all of the torque output by the engine 12 will be present in the shaft 28.

In the embodiment shown in FIG. 1, there is a known relationship between the torque on the shaft 28 and the output torque of the generator 14, as seen by the shaft 26. Because the generator output torque can be determined, for example through a knowledge of the generator current, the output torque of the engine 12 is readily determined. This method of determining the engine output torque only considers the engine output torque seen by the shaft 28. Thus, it is desirable to disable devices that affect the torque output by the engine 12, thereby changing the torque at the shaft 28. At step 66, devices such as the compressor 59 of the air conditioning system 58, and the purge operation of the carbon canister 56, are disabled so that the engine output torque can be more accurately determined at step 68.

A shown in the flowchart 60, the next operation is to determine a torque offset—see step 70. The torque offset is defined as the difference between the torque command provided at step 62, and the engine output torque, determined at step 68. At this point, the torque offset may be filtered and clipped to reject noise inherent in the torque offset determination. At decision block 72 it is determined whether this is the first time the adaption algorithm has been run. If it is, the offset is stored for later use—see step 74—and the method loops back to step 68, where the engine output torque is again determined.

Steps 70 and 72 are again performed, with the decision at step 72 yielding the result that this is not the first time that the adaption algorithm has been run. Thus, the method proceeds to decision block 76. Decision blocks 76 and 78 help to ensure that the torque offset is stable before it is used to determine the torque misfire limit for the engine 12. In particular, at decision block 76, it is determined whether the torque offset is within a predetermined torque offset range, and at decision block 78 it is determined whether it is within that range for a predetermined period of time. If the torque offset is not within the predetermined torque offset range, the method loops back to step 68, and the engine output torque is again determined. If the torque offset is within the predetermined torque offset range, it is then determined whether the predetermined period of time has elapsed. If it has not, the method loops back to decision block 76 to determine if the torque offset is still within the predetermined torque offset range. The reason this determination is necessary, is because the steps shown in the flowchart 60 represent an ongoing process that is being continually updated when the adaption algorithm is performed. Thus, the engine output torque changes over time, which will in turn change the value of the torque offset.

If the torque offset is within the predetermined torque offset range for the predetermined period of time, the method advances to step 80, where the current value of the torque offset is mathematically combined with the stored value of the torque offset—in this case, the torque offsets are averaged. By averaging values of the torque offsets, changes to the misfire torque limit will be smoother and less abrupt. At step 82, the average value of the torque offsets is stored, where it is available to use to set a new misfire torque limit. That is, the misfire torque limit for the vehicle 10 will be determined by using a previous value of the misfire torque limit, adjusted by the value of the stored torque offset—see step 84.

As shown in FIG. 2B, the average value of the torque offset is stored at step 82 prior to its use in determining the misfire torque limit at step 84. In fact, determination of the new misfire torque limit may be delayed until the engine 12 is commanded into an idle state. Alternatively, the torque offset can be used to immediately determine a new value for the misfire torque limit, and the new value for the misfire torque limit can then be stored instead of the torque offset. In either embodiment, the torque offset will eventually be used to determine a misfire torque limit that is indicative of actual engine conditions. One advantage of storing the torque offset is that it can be mathematically combined with subsequently determined torque offsets to provide a smoother transition between a previous misfire torque limit and a subsequent misfire torque limit.

Figure 3A:
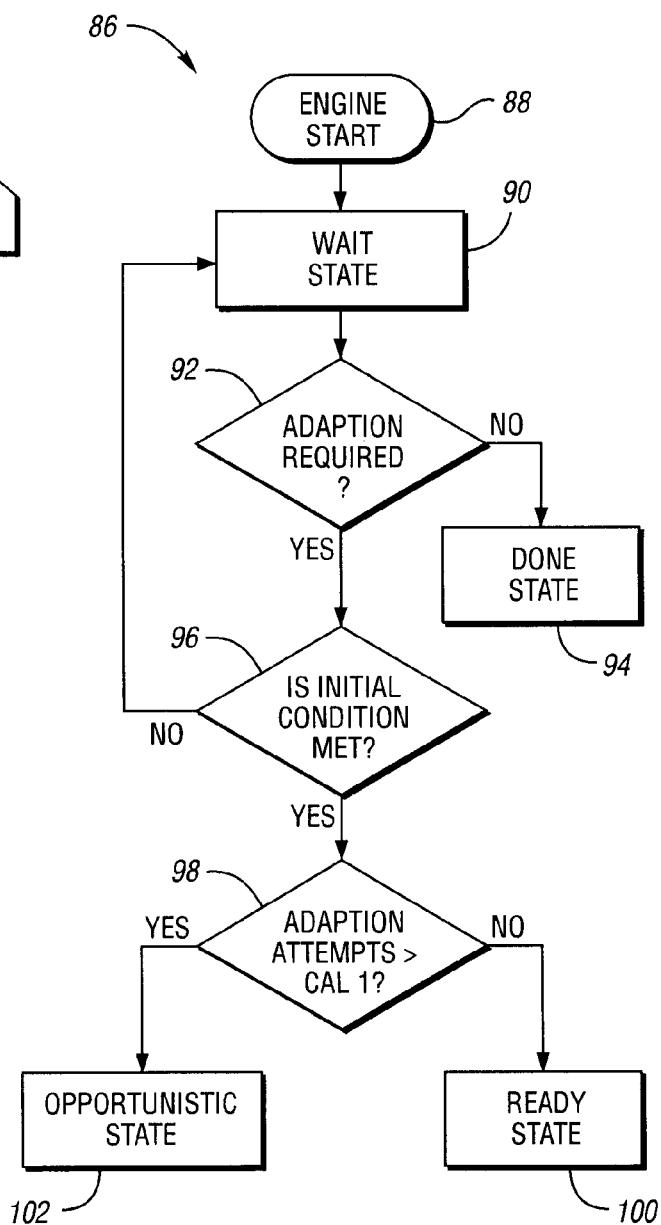

The adaption algorithm illustrated in FIGS. 2A and 2B is easily integrated into a larger method, which examines a number of different conditions to determine how the adaption algorithm is used. For example, FIGS. 3A–3C show a flowchart 86 illustrating a method that integrates the adaption algorithm shown in FIGS. 2A and 2B. As shown in FIG. 3A, the flowchart 86 begins with an engine start at step 88. After starting, the engine 12 is put into a "Wait State"—see block 90—which is characterized by normal engine operation. In the wait state, the previously stored torque offset is used when the engine 12 is operated at idle. At decision block 92, it is determined whether adaption is required for this engine cycle. In particular, it may be desirable to limit the use of the adaption algorithm so that it is not performed each time the driver starts the vehicle with a key, but rather, is only performed on the $n^{th}$ key cycle. If, at decision block 92, it is determined that adaption is not required for this key cycle, the method is ended at the "Done State"—see block 94.

If it is determined that adaption is required for this key cycle, one or more initial conditions may be examined—see decision block 96. The initial conditions examined at decision block 96 may include such things as whether a vehicle transmission gear is in a forward gear, such as a drive gear or low gear, whether a discharge power limit for an energy storage device, such as a battery, is greater than some predetermined discharge power limit value, whether a charge power limit for the battery is greater than a predetermined charge power limit value, and whether an engine coolant temperature is within a predetermined engine coolant temperature range.

These are just a few examples of various conditions that can be determined prior to executing the adaption algorithm shown in FIGS. 2A and 2B. If the criteria set up in decision block 96 are not met, the method returns to the Wait State at block 90. If the initial conditions are met, the method moves to decision block 98, where the number of times adaption has been attempted is determined. As explained below, the adaption algorithm shown in FIGS. 2A and 2B may be started, but for a number of reasons, may not be completed prior to the new torque offset value being determined and stored. When this occurs, a counter is incremented so that the number of adaption attempts is tracked. As shown at decision block 98, if the number of adaption attempts is not greater than a predetermined number (CAL 1), the method moves to a "Ready State"—see block 100. If, conversely, the number of adaption attempts is greater than CAL 1, the method moves to an "Opportunistic State"—see block 102.

FIGS. 3B and 3C, respectively illustrate the Ready State and the Opportunistic State. Turning first to FIG. 3B, the Ready State begins with a command at step 104 that prohibits engine shutdown. Prohibiting engine shutdown helps to ensure that the adaption algorithm will be completed once it has begun. Although a number of initial conditions are examined prior to entering the Ready State, decision block 106 examines one or more secondary conditions prior to advancing to the next step. For example, the secondary conditions may include such things as the vehicle speed being less than a predetermined vehicle speed, the accelerator pedal being disengaged, a brake pedal being engaged, an engine power command being less than a predetermined engine power command, and an engine speed being less than a predetermined engine speed. As with the initial conditions examined at decision block 96, the secondary conditions examined at decision block 106 may include more or less conditions than those enumerated above, or alternatively, may be omitted. Ensuring that certain conditions are met before the adaption algorithm is executed may be desirable, however, in that it may provide for smoother operation and/or greater accuracy in determining the torque offset, and hence, the misfire torque limit.

If the secondary conditions examined at decision block 106 are met, step 108 begins execution of the adaption algorithm illustrated in FIGS. 2A and 2B. At decision block 110, it is determined whether the adaption algorithm has completed. If it has, the method transitions into the Done State—see block 94. This is the same "Done State" shown in FIG. 3A. It is worth noting here that adaption may be completed at either step 82 or 84—see FIG. 2B—depending on how the torque offset is used.

If, at decision block 110, it is determined that the adaption algorithm has not completed, the secondary conditions are again examined—see decision block 112. While the adaption algorithm is being executed, the secondary conditions may be examined at some predetermined interval to determine if any of the conditions have changed, and in particular, if any of the conditions are no longer met. In addition, it is determined at decision block 112 whether a predetermined time has elapsed—i.e., whether a timeout has occurred. Because the secondary conditions are being examined at some interval throughout execution of the adaption algorithm, the predetermined time (timeout) can also be considered one of the secondary conditions, although it is not examined until the adaption algorithm has begun to be executed.

If the adaption algorithm has not timed-out, and if the secondary conditions have not changed such that one or more of them is no longer met, then the method loops back to decision block 110 to determine if adaption is complete. Thus, the adaption algorithm will be executed until it is complete, until a timeout occurs, or until the secondary conditions change. As noted above, if the adaption algorithm completes, the method transitions into the Done State—see block 94. If the adaption algorithm does not complete before a timeout, or before the secondary conditions change such that one or more is no longer met, then the method exits the adaption algorithm—see step 114.

At step 114, a counter is incremented, to track the number of times the adaption algorithm executes without completing. It is next determined whether the number of adaption attempts is greater than CAL 1—see decision block 98'. If the number of adaption attempts is not greater than CAL 1, the method stays within the Ready State, and loops back to step 104. If, however, the number of adaption attempts is greater than CAL 1, the method moves to the Opportunistic State—see block 102.

Turning now to FIG. 3C, the Opportunistic State is examined. The primary difference between the Opportunistic State and the Ready State is that engine shutdown is allowed when in the Opportunistic State. The Opportunistic State begins at decision block 106', where it is determined whether one or more secondary conditions are met. The secondary conditions examined in the Opportunistic State may be the same as those used in the Ready State plus the additional condition of whether the engine is operating. This condition is not used in the Ready State, since engine shutdown is prohibited in the Ready State.

As shown in FIG. 3C, the Opportunistic State does not allow movement from decision block 106' until the secondary conditions are met. Once they are met, the Opportunistic State begins execution of the adaption algorithm—see step 108'. As with the Ready State, the secondary conditions, as well as a predetermined timeout, may be periodically examined throughout the execution of the adaption algorithm. Thus, at decision block 110', it is determined whether the adaption algorithm has completed. If the adaption does complete, the method exits into the Done State—see block 94.

If, at decision block 110', it is determined that adaption is not complete, it is next determined whether a timeout has occurred, or whether the secondary conditions have changed such that one or more of them is no longer met—see decision block 112'. Just as in the Ready State, if timeout has not occurred, and the secondary conditions have not changed, the method loops back to determine if the adaption algorithm is complete—see decision block 110'.

If, at decision block 112', it is determined that timeout has occurred or that the secondary conditions have changed such that one or more is no longer met, the method continues to decision block 116. At decision block 116, it is determined whether the vehicle has accelerated to some predetermined vehicle speed. If it has not, the method stays at decision block 116, until the vehicle does reach the predetermined speed. This provides a delay before the adaption algorithm is restarted. Once the vehicle has reached the predetermined speed, the method loops back to decision block 106', where the secondary conditions are again examined.

It is clear from the steps shown in FIG. 3C that while the vehicle is operating, the Opportunistic State can only be exited when the adaption algorithm is complete. As noted above, for purposes of reaching the Done State, the adaption algorithm may be considered complete at step 82, when the newly determined value of the torque offset is stored for later use. Thus, the present invention provides an adaption algorithm that can be used to meet the competing goals of keeping the misfire torque limit low, while helping to ensure stable engine combustion.

While the best mode for carrying out the invention has been described in detail, those familiar with the art to which this invention relates will recognize various alternative designs and embodiments for practicing the invention as defined by the following claims.

The invention claimed is:

1. A method for determining an idle torque for an engine in a vehicle, the idle torque for the engine being at least partly based on an engine torque level below which engine misfires will occur, the vehicle including an electric machine operable to provide torque to the engine, the method comprising:
    commanding the engine to operate in an idle state, including providing a torque command to the engine;
    determining an output torque of the engine while the engine is in the idle state;
    determining a torque offset defined as a difference between the torque command and the determined engine output torque; and
    determining the idle torque for the engine based at least in part on the torque offset.

2. The method of claim 1, wherein determining the idle torque for the engine includes mathematically combining the torque offset with a stored torque offset, and determining the idle torque based at least in part on the mathematical combination of the offsets.

3. The method of claim 1, the vehicle further including an air conditioning system compressor and an emissions system carbon canister, the method further comprising:
    prohibiting operation of the compressor while the output torque of the engine is being determined; and
    prohibiting purge of the carbon canister while the output torque of the engine is being determined.

4. The method of claim 1, further comprising:
    determining whether the torque offset is within a predetermined torque offset range for a predetermined period of time; and
    waiting to determine the idle torque for the engine until the torque offset is within the predetermined torque offset range for the predetermined period of time.

5. The method of claim 1, further comprising:
    prohibiting engine shutdown prior to commanding the engine to operate in the idle state.

6. The method of claim 1, wherein commanding the engine to operate in the idle state further includes providing a speed command to the engine.

7. The method of claim 1, wherein the determined engine output torque is at least partly based on an output torque of the electric machine.

8. A method for determining an idle torque for an engine in a vehicle, the vehicle including an electric machine operable to provide torque to the engine, and an energy storage device capable of providing energy to operate the electric machine, the method comprising:
   determining whether at least one initial condition is met; and
   initiating an idle torque adaption algorithm when the at least one initial condition is met, the idle torque adaption algorithm including,
   a) commanding the engine to operate in an idle state, including providing a torque command to the engine,
   b) determining an output torque of the engine while the engine is in the idle state,
   c) determining a torque offset defined as a difference between the torque command and the determined engine output torque,
   d) determining whether at least one secondary condition is met,
   e) determining the idle torque for the engine based at least in part on the torque offset when the at least one secondary condition is met, and
   f) restarting the idle torque adaption algorithm when the at least one secondary condition is not met.

9. The method of claim 8, wherein the at least one initial condition is chosen from a first set of conditions, including a vehicle transmission gear being in a drive gear or a low gear, a discharge power limit for the energy storage device being greater than a predetermined discharge power limit value, a charge power limit for the energy storage device being greater than a predetermined charge power limit value, and an engine coolant temperature being within a predetermined engine coolant temperature range.

10. The method of claim 8, wherein the at least one secondary condition is chosen from a second set of conditions, including a vehicle speed being less than a predetermined vehicle speed, an accelerator pedal being disengaged, a brake pedal being engaged, an engine power command being less than a predetermined engine power command, an engine speed being less than a predetermined engine speed, and a time since initiating the idle torque adaption algorithm being less than a predetermined time.

11. The method of claim 8, further comprising:
   counting the number of times the idle torque adaption algorithm is restarted;
   prohibiting engine shutdown when the number of times the idle torque adaption algorithm is restarted is at or below a predetermined number; and
   allowing engine shutdown when the number of times the idle torque adaption algorithm is restarted is above the predetermined number.

12. The method of claim 8, wherein determining the idle torque for the engine includes mathematically combining the torque offset with a stored torque offset, and determining the idle torque based at least in part on the mathematical combination of offsets.

13. The method of claim 8, the vehicle further including an air conditioning system compressor and an emissions system carbon canister, the method further comprising:
   prohibiting operation of the compressor while the output torque of the engine is being determined; and
   prohibiting purge of the carbon canister while the output torque of the engine is being determined.

14. The method of claim 8, further comprising:
   determining whether the torque offset is within a predetermined torque offset range for a predetermined period of time; and
   waiting to determine the idle torque for the engine until the torque offset is within the predetermined torque offset range for the predetermined period of time.

15. The method of claim 8, further comprising:
   prohibiting engine shutdown prior to commanding the engine to operate in the idle state.

16. The method of claim 8, wherein commanding the engine to operate in the idle state further includes providing a speed command to the engine.

17. The method of claim 8, wherein the determined engine output torque is at least partly based on an output torque of the electric machine.

18. A vehicle comprising:
   an engine;
   an electric machine operable to provide a torque to the engine; and
   at least one controller configured to command the engine to operate in an idle state by at least providing a torque command to the engine, the at least one controller being further configured to determine an output torque of the engine while the engine is in the idle state, determine a torque offset defined as a difference between the torque command and the determined engine output torque, and determine the idle torque for the engine based at least in part on the torque offset.

19. The vehicle of claim 18, wherein the at least one controller is further configured to mathematically combine the torque offset with a stored torque offset, and to determine the idle torque based at least in part on the mathematical combination of the offsets.

20. The vehicle of claim 18, further comprising:
   an air conditioning system including a compressor; and
   an emissions system including a carbon canister, and wherein, the at least one controller is further configured to prohibit operation of the compressor and prohibit purge of the carbon canister while the output torque of the engine is being determined.

21. The vehicle of claim 18, wherein the at least one controller is further configured to determine whether the torque offset is within a predetermined torque offset range for a predetermined period of time, and to wait to determine the idle torque for the engine until the torque offset is within the predetermined torque offset range for the predetermined period of time.

22. The vehicle of claim 18, wherein the controller is further configured to prohibit engine shutdown prior to commanding the engine to operate in the idle state.

23. The vehicle of claim 18, wherein the controller is configured to determine the engine output torque based at least in part on an output torque of the electric machine.

* * * * *